(12) United States Patent
Angus et al.

(10) Patent No.: US 9,020,886 B2
(45) Date of Patent: Apr. 28, 2015

(54) PEER TO PEER DIAGNOSTIC TOOL

(75) Inventors: Robin Angus, Scotland (GB); Gordon Walker, Scotland (GB)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 12/977,234

(22) Filed: Dec. 23, 2010

(65) Prior Publication Data

US 2012/0166491 A1 Jun. 28, 2012

(51) Int. Cl.
*G06F 17/30* (2006.01)
*G06F 11/30* (2006.01)

(52) U.S. Cl.
CPC ........ *G06F 11/3089* (2013.01); *G06F 11/3006* (2013.01)

(58) Field of Classification Search
USPC ........................................................ 235/375
See application file for complete search history.

(56) References Cited

U.S. PATENT DOCUMENTS

| | | | |
|---|---|---|---|
| 6,672,505 B1* | 1/2004 | Steinmetz et al. | 235/379 |
| 7,445,144 B2* | 11/2008 | Schlabach et al. | 235/379 |
| 7,545,816 B1* | 6/2009 | Coutts et al. | 370/400 |
| 7,641,107 B1* | 1/2010 | Gill et al. | 235/379 |
| 2007/0192178 A1* | 8/2007 | Fung et al. | 705/14 |
| 2008/0126881 A1* | 5/2008 | Bruckhaus | 714/47 |
| 2008/0140355 A1* | 6/2008 | Ramsey et al. | 702/187 |
| 2010/0198024 A1* | 8/2010 | Elazari-Volcani et al. | 600/301 |
| 2010/0302043 A1* | 12/2010 | Skubic et al. | 340/573.1 |
| 2010/0310171 A1* | 12/2010 | Miletzki | 382/182 |

* cited by examiner

*Primary Examiner* — Hung Q Pham
(74) *Attorney, Agent, or Firm* — Joseph P. Mehrle

(57) ABSTRACT

A diagnostic tool comprises a memory device which stores a database of parametric performance data of a collection of transaction terminals possibly owned by different entities. Each time the tool is authorized to connect to a transaction terminal the database is accessed by a processor and a determination is made whether one or more parameter of the transaction terminal lies within a threshold amount of a statistical measure based upon the parametric performance data of the collection of transaction terminals.

20 Claims, 3 Drawing Sheets

FIG. 3
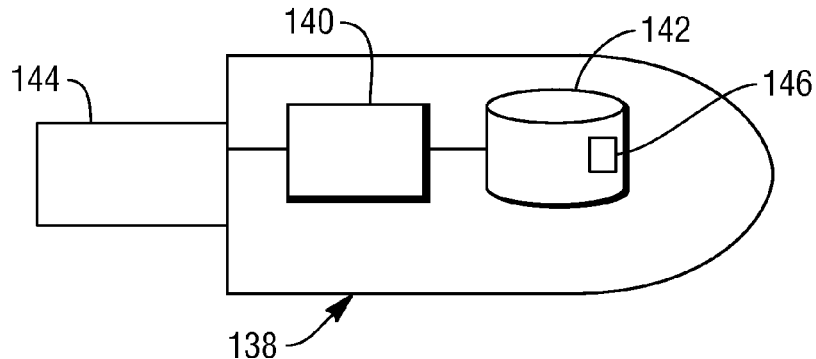
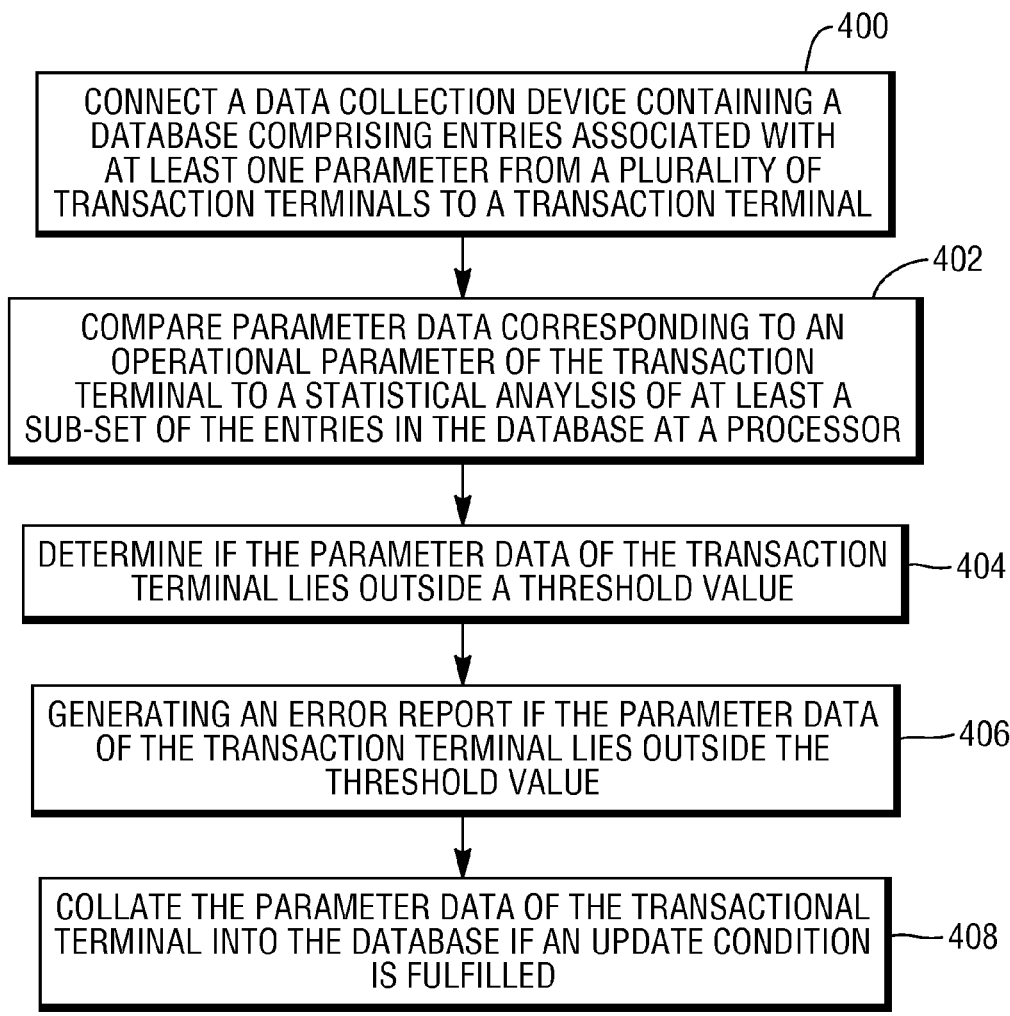
FIG. 4

PEER TO PEER DIAGNOSTIC TOOL

FIELD OF THE INVENTION

This invention relates to a peer to peer diagnostic tool. More particularly, but not exclusively, it relates to a peer to peer diagnostic tool arranged to gather performance data from a plurality of devices. Even more particularly, but not exclusively, it relates to a peer to peer diagnostic tool arranged to gather performance data from a plurality of devices operated by at least two distinct entities. Yet more particularly, but not exclusively, it relates to a peer to peer diagnostic tool arranged to gather performance data from a plurality of transaction terminals operated by at least two distinct entities.

BACKGROUND TO THE INVENTION

Device management strategies are becoming more intelligent utilizing the increasing processing power available on board and richer data from more sophisticated instrumentation. One approach to managing this complexity is to apply artificial intelligence and adaptive algorithms which optimize the performance or report problems based on the performance trends of the individual device or a group of devices.

While it is relatively simple to incorporate local instrumentation data into intelligent algorithms decision making, it is difficult to aggregate the data of whole networks of devices to better inform local decision making. The key difficulties are that customer secure networks are not typically available to the terminal for open peer to peer communication or for vendor controlled software updates. Typically any communications over the customer operated networks must be part of formally released customer updates which limits the flexibility and frequency of update.

Therefore a problem with the existing systems is how to share some form of aggregated performance data between peers to allow them to determine what the correct reporting or action thresholds of behavior are for achieving optimal reliability.

For example, a customer engineer may service thirty to forty automated teller machines (ATMs) with their own specific geographic territory. These ATMs may be divided between two to more financial institutions. Whilst the ATMs of one financial institution may share diagnostic information via a central management system via the financial institution's secure network. However, obtaining sufficient granularity, for example on a geographic basis, to set thresholds for instigating actions, such as customer engineer call out or taking a device out of operation, due to problems occurring can prove difficult where each financial institution has a limited number of ATMs within a particular environment. For example, a financial institution may have thousands of ATMs across the U.S. but, for example, only five in Alaska, cold related problems in Alaska will not show as a major problem within the institution's network. However, across the ATMs of all financial institutions operating within, for example, Alaska, there will be a great richness of data in relation to cold related problems. However, due to the requirement for security in financial institutions and the consequent isolated nature of these institutions' networks the richness of this data cannot currently be captured.

Allied with the capture of granular performance data is the ability to set local performance thresholds based upon this local performance data. However, this is not currently practical due to there possibly only being a few ATMs in each local area for each financial institution.

SUMMARY OF THE INVENTION

According to a first aspect of the present invention there is provided a data collection device arranged to be connected to a transaction terminal, the data collection device comprising a data storage device, the data storage device being arranged to store a database comprising parameter data relating to a plurality of transaction terminals, and the data storage device being arranged to receive parameter data from a processor of a transaction terminal upon connection of the device to said transaction terminal and being further arranged to update the database with parameter data associated with said transaction terminal.

The data collection device may comprise a processor.

The processor may be arranged to mediate communications between the data storage device and the processor of the transaction terminal.

The processor may be arranged to access the database and to perform a statistical analysis upon at least a sub-set of the entries in the database. The processor may be arranged to determine an average value of a parameter from parameter data collected from at least some of the transaction terminals.

The processor may be arranged to collect an identifier of the transaction terminal and to compare the identifier to all identifiers stored in the database and updating the parameter data within the database only if the identifier of the transaction terminal does not appear in the database. The processor may be arranged to collect said identifier prior to collecting the parameter data. The processor may be arranged to collect said identifier with the parameter data.

The comparison of an identifier with those already stored in the database reduces the likelihood of any statistical analysis being skewed by having parameter data from the same transaction terminal repeated.

The identifier may be a serial number, for example the manufacturer's serial number. The processor may be arranged to anonymise the parameter data. The processor may be arranged to strip identification data from a header portion of the parameter data.

This provides a mechanism whereby the identity of the transaction terminal can be determined in a manner which is independent of the operator of the terminal, thus the parameter data of the terminal are not tied to the financial institution which owns and operates it.

According to a second aspect of the present invention there is provided a transaction terminal arranged to communicate with a data collection device according to the first aspect of the present invention.

The transaction terminal may comprise a processor arranged to collate parameter data. The parameter data may relate to operations of peripheral devices of terminal.

The processor may be arranged to access the database stored on the data collection device and may be arranged to compare at least one piece of parameter data with a corresponding sub-set of the entries in the database. The processor may be arranged to generate an error report if the at least one piece of parameter data deviates from a statistical measure associated with the sub-set of entries in the database by more than a pre-determined amount. The statistical measure may comprise an average value of the sub-set of entries. The pre-determined amount may comprise a multiple of the standard deviation of at least some of the sub-set of entries.

The use of only a sub-set of stored parameter values to set a threshold, pre-determined amount, allows the setting of threshold values which are not skewed by geographical biases, outliers and possibly anomalous parameter values.

The processor may be arranged to store the error report locally at the transaction terminal. The processor may be arranged to output the error report to a remote host via a data communications network. The processor may be arranged to output the error report to a service panel of the transaction terminal.

The processor may be arranged to add an entry to a field of the database associated with the at least one piece of parameter data and to add an entry to the device identifier field if a comparison of entries in a device identifier field of the database to a device identifier associated with the transaction terminal indicates that there is no entry in the database associated with the parameter of the at least one piece of parameter data.

The processor may be arranged to update an entry in a field of the database associated with the at least one piece of parameter data if a comparison of entries in a device identifier field of the database to a device identifier associated with the transaction terminal indicates that there is an entry in the database associated with the parameter of the at least one piece of parameter data.

The processor may be arranged to update an entry in a field of the database associated with the at least one piece of parameter data if a comparison of entries in a device identifier field of the database to a device identifier associated with the transaction terminal indicates that there is an entry in the database associated with the parameter of the at least one piece of parameter data and the value of the parameter data deviates from the sub-set of entries in the database by more than a pre-determined amount.

The processor may be arranged to update an entry in a field of the database associated with the at least one piece of parameter data if a comparison of entries in a device identifier field of the database to a device identifier associated with the transaction terminal indicates that there is an entry in the database associated with the parameter of the at least one piece of parameter data and more than a predetermined amount of time has elapsed since data associated with the transaction terminal was updated.

The comparison of an identifier with those already stored in the database reduces the likelihood any statistical analysis being skewed by having parameter data from the same transaction terminal repeated.

The device identifier may be a serial number, for example the manufacturer's serial number. The processor may be arranged to anonymise the parameter data. The processor may be arranged to strip identification data from a header portion of the parameter data.

This provides a mechanism whereby the identity of the transaction terminal can be determined in a manner which is independent of the operator of the terminal, thus the parameter data of the terminal are not tied to the financial institution which owns and operates it.

The transaction terminal may comprise any of the following: an automated teller machine (ATM), an information kiosk, an electronic funds transfer (EFT) terminal, a financial services centre, a bill payment kiosk, a lottery kiosk, a postal services machine, a check-in and/or check-out terminal, a point-of-sale (POS) barcode scanner, POS terminal.

According to a third aspect of the present invention there is provided a method of analyzing parameter data from transaction terminals, the method comprising the steps of:

(i) connecting a data collection device containing a database comprising entries associated with at least one parameter from a plurality of transaction terminals to a transaction terminal;
(ii) comparing parameter data corresponding to an operational parameter of the transaction terminal to a statistical analysis of at least a sub-set of the entries in the database at a processor;
(iii) determining if the parameter data of the transaction terminal lies outside a threshold value using the comparison of step (ii);
(iv) generating an error report if the parameter data of the transaction terminal lies outside the threshold value; and
(v) collating the parameter data of the transactional terminal into the database if an update condition is fulfilled.

The method may comprise adding an entry to a field of the database associated with the at least one piece of parameter data and to add an entry to the device identifier field at a processor if a comparison of entries in a device identifier field of the database to a device identifier associated with the transaction terminal indicates that there is no entry in the database associated with the parameter of the at least one piece of parameter data.

The method may comprise updating an entry in a field of the database associated with the at least one piece of parameter data at a processor if a comparison of entries in a device identifier field of the database to a device identifier associated with the transaction terminal indicates that there is an entry in the database associated with the parameter of the at least one piece of parameter data.

The method may comprise updating an entry in a field of the database associated with the at least one piece of parameter data at a processor if a comparison of entries in a device identifier field of the database to a device identifier associated with the transaction terminal indicates that there is an entry in the database associated with the parameter of the at least one piece of parameter data and the value of the parameter data deviates from the sub-set of entries in the database by more than a pre-determined amount.

The method may comprise updating an entry in a field of the database associated with the at least one piece of parameter data at a processor if a comparison of entries in a device identifier field of the database to a device identifier associated with the transaction terminal indicates that there is an entry in the database associated with the parameter of the at least one piece of parameter data and more than a predetermined amount of time has elapsed since data associated with the transaction terminal was updated.

The device identifier may be a serial number, for example the manufacturer's serial number. The method may comprise anonymising the parameter data at the processor. The method may comprise stripping identification data from a header portion of the parameter data at the processor.

The transaction terminal may comprise any of the following: an automated teller machine (ATM), an information kiosk, an electronic funds transfer (EFT) terminal, a financial services centre, a bill payment kiosk, a lottery kiosk, a postal services machine, a check-in and/or check-out terminal, a point-of-sale (POS) barcode scanner, POS terminal.

BRIEF DESCRIPTION OF THE DRAWINGS

Embodiments of the present invention will now be described, by way of example only, with reference to the accompanying drawings, in which:

FIG. 3 is a schematic representation of a service engineer's access dongle according to a further aspect of the present invention; and FIG. 4 is a flowchart detailing a method of analyzing parameter data from transaction terminals.

DETAILED DESCRIPTION OF PREFERRED EMBODIMENTS

Figure 1:
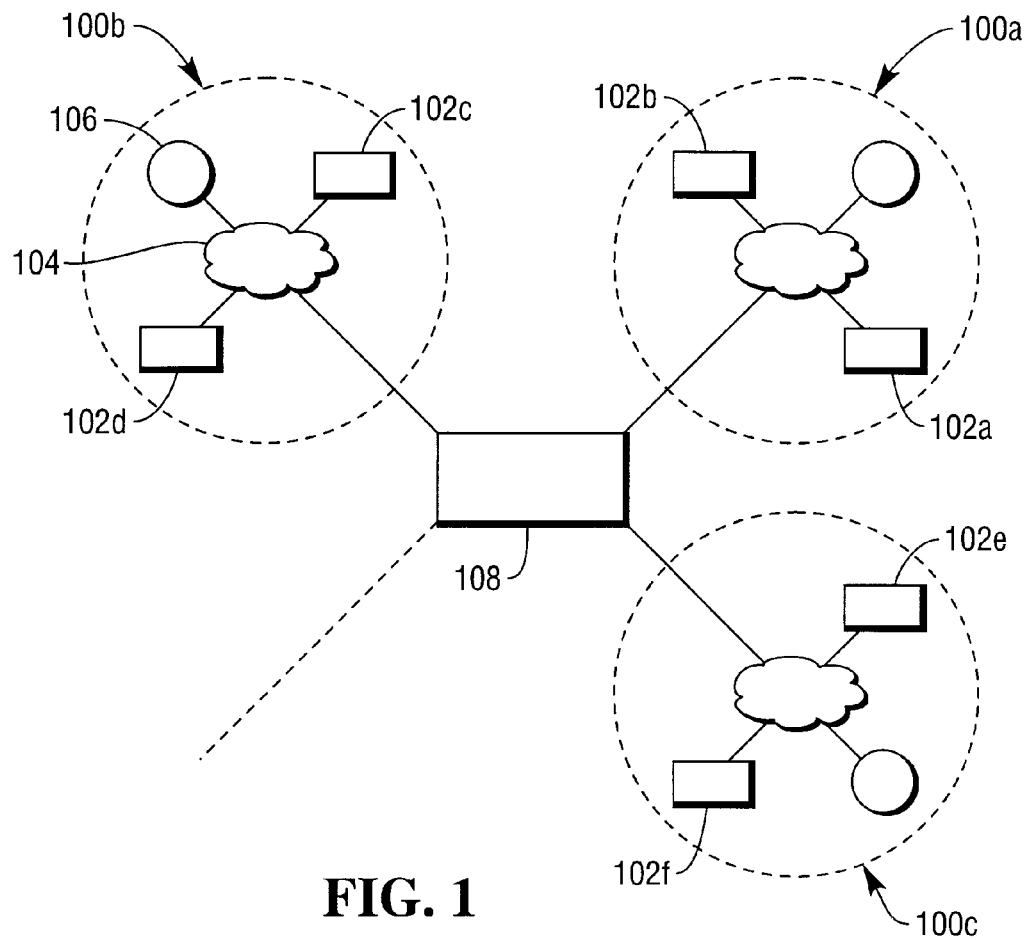
FIG. 1 is a schematic representation of networked ATMs belonging to different financial institutions.
Figure 2:
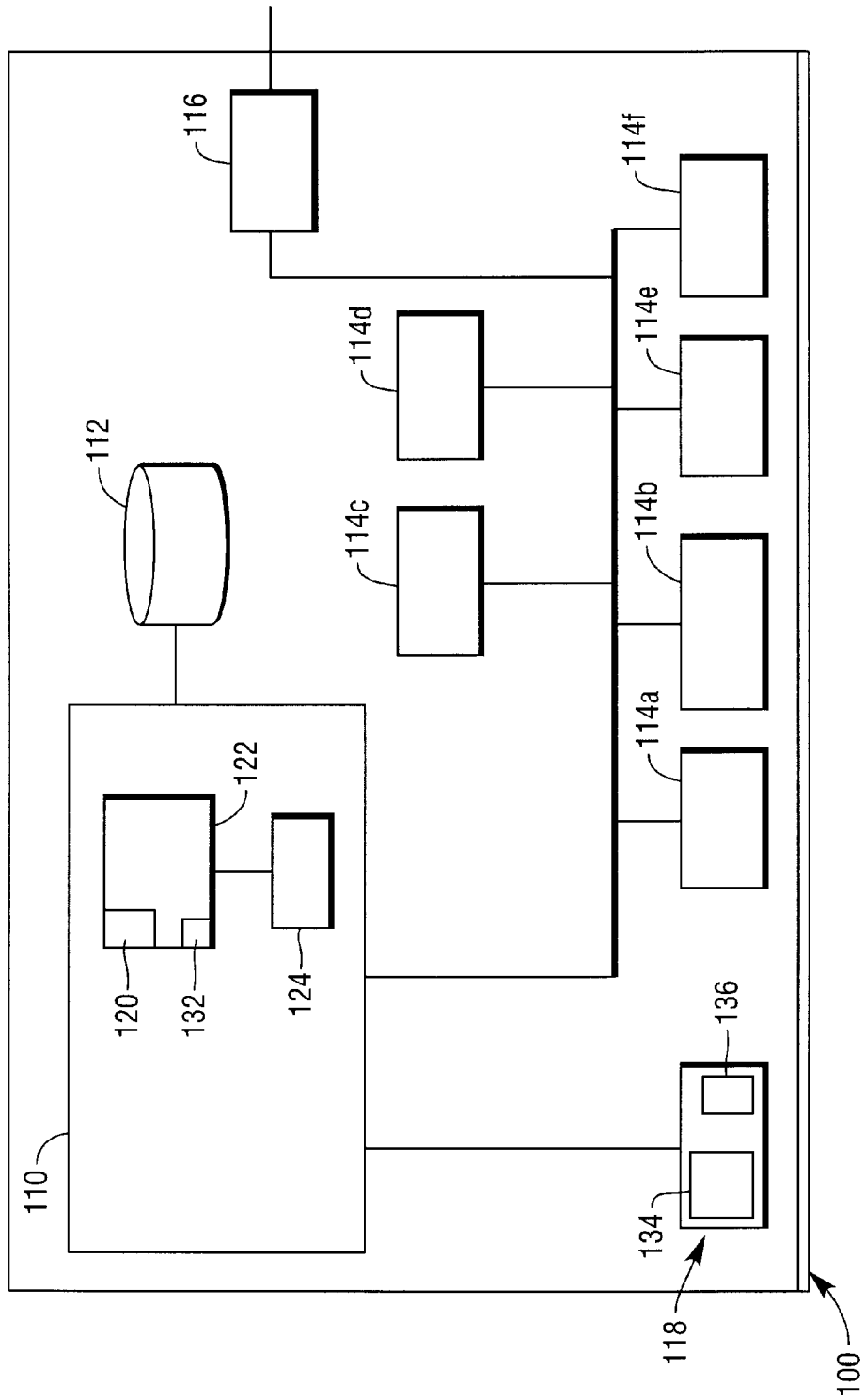
FIG. 2 is a representation of the internal devices and communications of an ATM.

Referring now to FIGS. 1 to 3, financial institution's networks 100a-c comprise ATMs 102a-f, a secure communications network 104, typically a virtual private network (VPN), and an authorization host 106. These networks 100a-c are used to process customer's transactions which are carried out on the ATMs 102a-f of the respective financial institutions networks 100a-c. A switch 108 is provided to allow communication between the networks 100a-c to facilitate "not on us" transactions where a customer of one financial institution uses an ATM 102a-f of another financial institution. Other than communications for "not on us" transactions there is little or no sharing of data between the networks 100a-c, in particular there is no sharing of performance data between the networks 100a-c.

Typically, each ATM 102a-f comprises a controller 110, a data storage device 112, a number of peripheral devices 114a-f, a network connection 116 and an engineer interface 118. Typically, the controller 110 is a PC core operating under a Microsoft Windows™ operating system. Normally, the data storage device 112 is a magnetic disc and may form part of the controller in some embodiments.

The controller 110 is typically a PC core running the Microsoft® Windows XP® system. The controller 110 comprises a BIOS 120 stored in non-volatile memory, a microprocessor 122 and associated main memory 124.

It will be appreciated that, unless otherwise stated, whenever an action, feature or function is attributed to the controller 110, microprocessor 122 or ATM 102a-f, it is understood that the action, feature or function is the result of the execution of software stored in respective main memory device 124 to produce the action, feature or function.

Typical peripheral devices found in the ATM 102a-f comprise, but are not limited to, a card reader device 114a, a receipt printer device 114b, a display 114c and associated function display keys (FDKs) 114d, an encrypting keypad 114f, and a dispenser device 114e.

In use, the ATM controller 110 loads an operating system kernel and an ATM application program, for example the APTRA XFS platform available form NCR Corporation of Duluth, Ga., into the main memory 124. The ATM application program acts as an API mediating communications between the controller 110 and the peripheral devices 114a-f and also between the controller 110 and the engineer interface 118.

The application program comprises a suite of routines and objects for controlling the operation of the ATM 102 such as providing the sequence of screens used in each transaction. The application program also comprises a number of service providers 132, in the case of APRTA XFS these will be CEN XFS service providers. The service providers 132 control at least one, possibly many, of the peripheral devices 114a-f, and/or applications running on the ATM 102a-f. For example the service provider relates to the encrypting keypad 114f drives requests for both an encryptor device and a keyboard device that comprise the keypad 114f. The service providers 132 drive requests from the controller 110 to the peripheral devices 114a-f. For example one service provider relates to the encrypting keypad 114f drives requests for both an encryptor device and a keyboard device that comprise the keypad 114f.

Typically, the driving of requests involves translating any proprietary communications, command data and/or response data required to drive the peripheral device 114a-f and monitor its performance. In an exemplary embodiment utilizing the CEN XFS standard, the standard defines a programming standard for communicating with each individual class of CEN XFS service provider 132, such that expected requests, excepted responses and events associated with each service provider 132 are defined.

The engineer interface 118 comprises a touch screen 134 and a USB connector 136.

A service engineer's USB dongle 138 comprises a processor 140, a memory device 142, typically a flash drive, and a USB connector 144 which is complementary to that of the engineer interface 118.

It will be appreciated that, unless otherwise stated, whenever an action, feature or function is attributed to the processor 140 of the dongle 138, it is understood that the action, feature or function is the result of the execution of software stored in respective memory device 142 to produce the action, feature or function.

In use, a service engineer inserts their dongle 138 into the engineer interface 118 by connecting the complementary USB connectors 136, 144. The controller 110 then verifies that the dongle 138 is authorized to service the ATM 102a by downloading engineer codes from the memory device 142 of the dongle 138 and comparing the downloaded engineer codes to codes stored in the main memory 124 of the ATM 102a. If the engineer codes from the dongle 138 match those stored on the ATM 102a the touch screen 134 is activated thereby allowing the service engineer to repair faults or replenish consumables in the ATM 102a, otherwise the touch screen 134 remains disabled.

The processor 140 of the dongle 138 communicates with the controller 110 and requests parameter data relating to one or more of the peripheral devices 114a-f of the ATM 102a-f. Alternatively, the parameter data can be pushed directly onto the memory device 142 of the dongle 138, without recourse to the processor 140, and indeed the processor 140 may be omitted. This parameter data can be stored in a central log, and alternatively or additionally, it may be stored in log data stored in local memory of the respective peripheral device. A non-limiting example of parameter data is the number of jams that have occurred in the dispenser since the last visit of a service engineer. Another non-limiting example of parameter data is the number of times that a card has jammed in the throat of the card reader.

The memory device 142 of the dongle 138 has a database 146 stored upon it which contains entries relating to parameter data obtained from at least some, but preferably all, of the ATMs 102a-f that the service engineer has visited. It will be appreciated that the database 146 may include data collected by other service engineers or provided by financial institutions. Thus, the process of sequential insertion of the dongle 138 into a number of ATMs 102a-f across the network 104 results in the database 146 stored on the dongle 138 reflecting performance of ATMs 102a-f across the network 104 in terms of device parameters.

In one embodiment, the database comprises entries relating to an average value for each parameter (typically with the average being the mean parameter value over the population of ATMs sampled), the calculated standard deviations of each parameter, and a list of identifiers of sampled ATMs (typically the identifiers will be the manufacturers serial numbers of each ATM sampled).

The controller 110 accesses the database 146 and extracts the average value for a given parameter, for example card or currency jams, from the database. The controller 110 then compares the average value to the corresponding parameter value for the ATM 102a and determines if the parameter value of the ATM 102a lies outside a threshold value for the parameter. The threshold value can be defined either as an absolute value, or as a multiple of the standard deviation from the average value of the parameter of interest. Should the ATM's parameter value lie outside the threshold value the controller 110 will, in at least one embodiment, generate an error report which will be logged to an error log internally. Additionally, the ATM 102a will typically forward an error report to a remote monitoring centre via the network 104 from where a suitably equipped service engineer can be dispatched to rectify the fault. Alternatively, or additionally, the error report can be displayed to the service engineer present via the touch screen 134 so that the service engineer can attempt to rectify the fault whilst they are servicing the ATM 102a.

Once the controller 110 has carried out the comparison between its parameter value and the average parameter value stored in the database 146 it checks the updates of the database 146 to determine if the database contains parameter data relating to the ATM 102a. Typically, this is done by comparing a device identifier field in the database 146 to a device identifier of the ATM 102a. In at least one embodiment, the device identifier will be the unique manufacturer's identification number of the ATM 102a, although other device identifiers can be used. The manufacturer's identification number is preferred as it anonymises the ATM 102a such that, if the USB dongle 138 were to be obtained by a third party, trends data relating to competing financial institutions could not be attributed readily to those financial institutions.

If the controller 110 determines that data corresponding to the parameter is not contained within the database 146 it is updated by entering the parameter value into the database such that the average value of the parameter and the standard deviation of the parameter are updated to reflect the addition of the parameter data from the ATM 102a. The device identifier of the ATM 102a is also entered into the database 146 to identify that parameter data from the ATM 102a is contained in the database 146, preferably a pointer between the device identifier entry and the parameter data is also constructed such that the two entries in the database are linked.

It will be appreciated that references herein to the controller 110 effecting an operation refer to the controller 110 running software or firmware which effects the operation in concert with the controller hardware.

In one embodiment, if the controller 110 determines that data corresponding to the parameter is contained within the database 146 it is updated by deleting the database entry corresponding to the prior parameter value from the ATM 102a and replacing it with the updated parameter value into the database. This results in the average value of the parameter and the standard deviation of the parameter reflecting the addition of the new parameter data from the ATM 102a. Preferably a pointer between the device identifier entry and the new parameter data is constructed such that the two entries in the database are linked to aid further updating of the database 146. Alternatively, in the case where the database 146 is populated with prior parameter data from the ATM 102a the database may only be updated if a particular rule is fulfilled. Non-limiting examples of such rules include: if the time elapsed since the last updating is over a pre-determined threshold, or if the new parameter data deviates from the prior parameter data by more than a pre-determined amount.

In another embodiment, if the controller 110 determines that data corresponding to the parameter is contained within the database 146 the database 146 is not updated.

It will be appreciated that each ATM 102a-f may not comprise the same peripheral components, for example different ATMs may comprise different models of card readers or card readers manufactured by different companies. Accordingly, the database 146 may contain a peripheral component identifier field. Thus, failures can be categorized according to the origin of a peripheral component, and failure trends analyzed by manufacturer.

It will be appreciated that the controller 110 is not limited to comparing and analyzing a single parameter of ATM performance, the controller 110 can be arranged to compare and analyze a number of performance parameters substantially simultaneously.

In anther embodiment, the dongle 138 stores performance parameters as an array of counts, each representing a range of performance, for example:

Terminal performance variable: 6.2
Portable storage device device array contents before insertion:
0 to 1.9: 3
2 to 3.9: 5
4 to 5.9: 6
6 to 7.9: 11
8 to 9.9: 8
10 to 11.9: 5
12 to 13.9: 3
14 or more: 1
Portable storage device array contents after insertion:
0 to 1.9: 3
2 to 3.9: 5
4 to 5.9: 6
6 to 7.9: 12 (This count incremented)
8 to 9.9: 8
10 to 11.9: 5
12 to 13.9: 3
14 or more: 1

In another, preferred embodiment, the ATM 102 a-f which is coupled to the dongle 138 registers its serial number against the parameter range uploaded to the database 146. Each time he USB dongle 138 was inserted into an ATM 102a-f the controller 110 searches for previous instances of the ATM's serial number, remove them and then register its serial number against the range corresponding to the current level of performance.

Terminal performance variable: 6.2
Terminal serial number: 3234
Portable storage device device array contents before insertion: (numbers are terminal serial numbers)
0 to 1.9: 1245, 3466
2 to 3.9: 3567, 9374, 3234
4 to 5.9: 3344, 8953, 6733, 4555
6 to 7.9: 0012, 3421, 0123, 4431, 0013, 0323
8 to 9.9: 0405, 3330, 4500, 0132, 4230, 8753, 4451, 0501
10 to 11.9: 2330, 0455, 5762, 5382, 4410
12 to 13.9: 2033, 5010, 3300
14 or more: 4876
Portable storage device array contents before insertion:
0 to 1.9: 1245, 3466
2 to 3.9: 3567, 9374 (terminal serial number deleted from this record)
4 to 5.9: 3344, 8953, 6733, 4555

6 to 7.9: 0012, 3421, 0123, 4431, 0013, 0323, 3234 (Terminal serial number added to this record)
8 to 9.9: 0405, 3330, 4500, 0132, 4230, 8753, 4451, 0501
10 to 11.9: 2330, 0455, 5762, 5382, 4410
12 to 13.9: 2033, 5010, 3300
14 or more: 4876

In this way it does not matter how often the dongle 138 is inserted into an ATM 102a-f. It can be updated as often as it is inserted and will always reflect the most up to date information that the dongle 138 has been exposed to and no terminal 102a-f can be over represented and this reduces the likelihood of skewing of the database entries.

In a further embodiment, the database 146 from a number of dongles 138 are uploaded to a base station such their contents can be interrogated to evaluate the performance of the ATMs 102a-f across the network 104, this allows for local geographical thresholds to be set to allow for localized conditions. For example, ATMs in Alaska may suffer downtime due to shutters jamming due to frosting, accordingly, data corresponding to these ATMs can be removed from the data used to calculate the threshold for this fault across the rest of the U.S.A. in order to prevent skewing of the threshold by a large number of faults due to climatic or other localized factors.

In an alternative embodiment, where the processor 140 is present, the statistical analysis of the parameter data database 146 can be carried out on the dongle's processor 140 whilst the dongle 138 is connected to an ATM 102a-f rather than at the controller 110.

It will be appreciated that although described with reference to an ATM the present invention is applicable to any suitable transaction terminal (SST) or network of SSTs in which data sharing to improve performance is desirable. Examples of suitable SSTs include, but are not limited to: an automated teller machine (ATM); an information kiosk; an electronic funds transfer (EFT) terminal a financial services centre; a video, DVD, multi-media, mpeg3 etc sales/rental kiosk; a bill payment kiosk; a lottery kiosk; a postal services machine; a check-in and/or check-out terminal such as those used in the retail, hotel, car rental, gaming, healthcare, and airline industries; or the like.

It will also be appreciated that although described with reference to a dongle the present invention may comprise a mobile telephone, a smart-phone or a personal digital assistant. In these instances the database is stored on a memory element of the device and data transfer between the transaction terminal and the device is executed via a wireless link, for example Bluetooth, WiFi etc.

Referring now to FIG. 4, a method of analyzing parameter data from transaction terminals, comprises the steps of connecting a data collection device containing a database comprising entries associated with at least one parameter from a plurality of transaction terminals to a transaction terminal (Step 400). A processor compares parameter data corresponding to an operational parameter of the transaction terminal to a statistical analysis of at least a sub-set of the entries in the database (Step 402). It is determined if the parameter data of the transaction terminal lies outside a threshold value (Step 404). An error report is generated if the parameter data of the transaction terminal lies outside the threshold value (Step 406). A processor collates the parameter data of the transactional terminal into the database if an update condition is fulfilled (Step 408).

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

It will be further appreciated that non-mutually exclusive elements of differing embodiments of the present invention may be freely interchanged, where applicable.

Various modifications may be made to the above described embodiments without departing from the spirit and the scope of the invention.

The invention claimed is:

1. A portable data collection device arranged to be connected to a plurality of transaction terminals by a service technician, the portable data collection device comprising:
    a memory device internal to the portable data collection device storing a database containing parameter data relating to operation of the plurality of transaction terminals;
    a processor communicating with the memory device; and
    a connection interface for connecting the portable data collection device to each of the plurality of transaction terminals, wherein the processor is utilized by the service technician to update the database containing parameter data relating to operation of the plurality of transaction terminals in the portable data collection device, and communicates with a controller of one of the transaction terminals where parameter data relating to operation of one from said one transaction terminal is directly pushed from the controller upon connection of the portable data collection device to said one transaction terminal and being further arranged to update the database with the parameter data relating to the operation of said one transaction terminal, and wherein the parameter data is anonymized with identification data included in a header portion of the parameter data stripped out.

2. The portable data collection device of claim 1, wherein the plurality of transaction terminals are operated by more than one entity.

3. The portable data collection device of claim 1, wherein the processor is further configured to access the database and to perform a statistical analysis upon at least a sub-set of the parameter data in the database.

4. The portable data collection device of claim 1, wherein the parameter data relates to peripherals of said one transaction terminal and comprises at least a number of jams of a dispenser and a number of times a card has jammed in a card reader since a last visit of the service technician.

5. The portable data collection device of claim 1, wherein the database comprises entries relating to an average value for each parameter.

6. The portable data collection device of claim 1, wherein the database stores a unique identification number for each of the plurality of transaction terminals.

7. The portable data collection device of claim 6, wherein parameter data relating to the operation of said one transaction terminal is linked with the unique identification number for said one transaction terminal.

8. A transaction terminal of a plurality of transaction terminals comprising:
    a processor within a transaction terminal configured to be operated by a service technician to communicate with a portable data storage device of the technician;
    wherein the portable data storage device is arranged to store a database containing parameter data relating to operation of the plurality of transaction terminals;
    wherein the processor is arranged to directly push parameter data associated with the transaction terminal to the portable data storage device upon connection of the portable data storage device to the transaction terminal, to update the database with the parameter data relating to operation of the transaction terminal connected to the portable data storage device, and to collate the parameter data relating to the operation of the transaction terminal with the parameter data relating to operation of the plurality of transaction terminals in the database and wherein the parameter data is anonymized with identification data in a header portion of the parameter data stripped out.

9. The terminal of claim 8, wherein the processor is arranged to access the database stored on the portable data storage device and is further arranged to compare at least one piece of the parameter data relating to the operation of the transaction terminal with a corresponding sub-set of the parameter data relating to operation of the plurality of transaction terminals in the database.

10. The terminal of claim 9, wherein the processor is arranged to generate an error report if the at least one piece of the parameter data relating to the operation of the transaction terminal deviates from a statistical measure associated with the sub-set of the parameter data in the database by more than a predetermined amount.

11. The terminal of claim 10, further comprising a service panel, wherein the processor is arranged to output the error report to the service panel.

12. The terminal of claim 8, wherein the processor is arranged to access the database stored on the portable data storage device and is further arranged to add the parameter data relating to the operation of the transaction terminal to the database when the database has no entry associated with the parameter data relating to the operation of the transaction terminal.

13. The terminal of claim 8, wherein the processor is arranged to access the database stored on the portable data storage device and is further arranged to update the parameter data relating to the operation of the transaction terminal to the database when more than a predetermined amount of time has elapsed since a previous update of the parameter data relating to the operation of the transaction terminal.

14. The terminal of claim 8, wherein the transaction terminal comprises any of the following: an automated teller machine (AIM), an information kiosk, an electronic funds transfer (EFT) terminal, a financial services centre, a bill payment kiosk, a lottery kiosk, a postal services machine, a check-in and/or check-out terminal, a point-of-sale (POS) barcode scanner, POS terminal.

15. A method of analyzing parameter data from one of a plurality of transaction terminals, the method comprising:
connecting to a database of a portable data collection device of a service technician by a processor of the one transaction terminal during servicing of the one transaction terminal by the service technician, the database including parameter data relating to operation of the plurality of transaction terminals, at least some of the parameter data acquired by the portable data collection device by a direct push from each of the plurality of transaction terminals when the portable data collection device is connected to a particular one of the plurality of transaction terminals and wherein the parameter data is anonymized by stripping out identification data from a header portion of the parameter data;
comparing specific parameter data, corresponding to an operational parameter of the one transaction terminal connected to the portable data collection device, to a statistical analysis of at least a sub-set of the parameter data in the database relating to operation of the plurality of transaction terminals by the processor;
determining by the processor when the specific parameter data corresponding to the operational parameter of the one transaction terminal lies outside a threshold value; and
generating by the processor an error report when the specific parameter data corresponding to the operational parameter of the one transaction terminal lies outside the threshold value.

16. The method of claim 15, wherein the plurality of transaction terminals are operated by more than one entity.

17. The method of claim 15, further comprising adding the specific parameter data corresponding to the operational parameter of the one transaction terminal to the database when the database fails to include an entry associated with the operational parameter of the one transaction terminal.

18. The method of claim 15, further comprising updating the specific parameter data corresponding to the operational parameter of the one transaction terminal to the database when more than a predetermined amount of time has elapsed since a previous update of the specific parameter data corresponding to the operational parameter of the one transaction terminal.

19. The method of claim 15, wherein the transaction terminal comprises any of the following: an automated teller machine (AIM), an information kiosk, an electronic funds transfer (EFT) terminal, a financial services centre, a bill payment kiosk, a lottery kiosk, a postal services machine, a check-in and/or check-out terminal, a point-of-sale (POS) barcode scanner, POS terminal.

20. A method of analyzing operational data of components within one of a plurality of transaction terminals during servicing of the one transaction terminal, the method comprising:
obtaining by a processor of the one transaction terminal the operational data of the components;
accessing by the processor a database for the plurality of transaction terminals stored in a portable storage device of a service technician when the portable storage device is connected to the one transaction terminal, wherein the database contains reference operational data of components within each of the plurality of transaction terminals and at least some of the operational data acquired by the portable storage device by a push from each of the plurality of transaction terminals when the portable storage device connected to each of the plurality of transaction terminals;
comparing the operational data of the components within the one transaction terminal to corresponding reference operational data within the database in the portable storage device and wherein the corresponding reference operational data within the database in the portable storage device is anonymized by stripping out identification data from a header portion of the operational data;
generating an error report indicative of a fault in one or more of the components of the one transaction terminal when the operational data of the components within the one transaction terminal differ from a statistical measure of the corresponding reference operational data within the database by a threshold value; and
alerting the service technician of the fault by the processor including displaying the error report on a service display of the one transaction terminal.

* * * * *